(12) United States Patent
Egawa et al.

(10) Patent No.: US 11,747,642 B2
(45) Date of Patent: Sep. 5, 2023

(54) OPTICAL UNIT

(71) Applicant: NIDEC CORPORATION, Kyoto (JP)

(72) Inventors: Tomohiro Egawa, Kyoto (JP); Keishi Otsubo, Kyoto (JP); Kazuhiro Sazai, Kyoto (JP); Genki Tanaka, Kyoto (JP); Takayuki Iwase, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 257 days.

(21) Appl. No.: 17/175,697

(22) Filed: Feb. 15, 2021

(65) Prior Publication Data

US 2021/0294111 A1 Sep. 23, 2021

(30) Foreign Application Priority Data

Mar. 23, 2020 (JP) ................. 2020-051171

(51) Int. Cl.
*G02B 27/64* (2006.01)
*G02B 26/08* (2006.01)
*G03B 5/00* (2021.01)
*G02B 7/18* (2021.01)

(52) U.S. Cl.
CPC ......... *G02B 27/646* (2013.01); *G02B 7/1805* (2013.01); *G02B 26/0816* (2013.01); *G03B 5/00* (2013.01); *G03B 2205/0007* (2013.01); *G03B 2205/0069* (2013.01)

(58) Field of Classification Search
CPC .............. G02B 27/646; G02B 7/1805; G02B 26/0816; G02B 13/0065; G03B 5/00; G03B 2205/0007; G03B 2205/0069; G03B 2205/0046; G03B 30/00
See application file for complete search history.

(56) References Cited

U.S. PATENT DOCUMENTS

| | | | |
|---|---|---|---|
| 10,488,631 B2 | 11/2019 | Bachar et al. | |
| 10,516,773 B2 | 12/2019 | Yoon et al. | |
| 10,678,062 B2 | 6/2020 | Im et al. | |
| 2019/0129197 A1 | 5/2019 | Kim et al. | |
| 2019/0230255 A1 | 7/2019 | Fu et al. | |
| 2020/0400464 A1* | 12/2020 | Yedid ................... | G02B 7/1827 |

FOREIGN PATENT DOCUMENTS

JP   2012118336 A   6/2012
JP      6613005 B1  11/2019

* cited by examiner

*Primary Examiner* — Darryl J Collins
*Assistant Examiner* — Matthew Y Lee
(74) *Attorney, Agent, or Firm* — HAUPTMAN HAM, LLP

(57) ABSTRACT

In an optical unit, a first swing mechanism swings a holder with reference to the y-axis direction, and a second swing mechanism swings the holder with reference to the z-axis direction. A case has a first recess that accommodates at least a part of a first protrusion of the holder and a second recess that accommodates at least a part of a second protrusion of the holder. The first recess has a first side surface located on one side in the y-axis direction of the first protrusion, a second side surface located on the other side in the y-axis direction of the first protrusion, and a bottom surface. The second recess has a first side surface located on one side in the y-axis direction of the second protrusion, a second side surface located on the other side in the y-axis direction of the second protrusion, and a bottom surface.

13 Claims, 12 Drawing Sheets

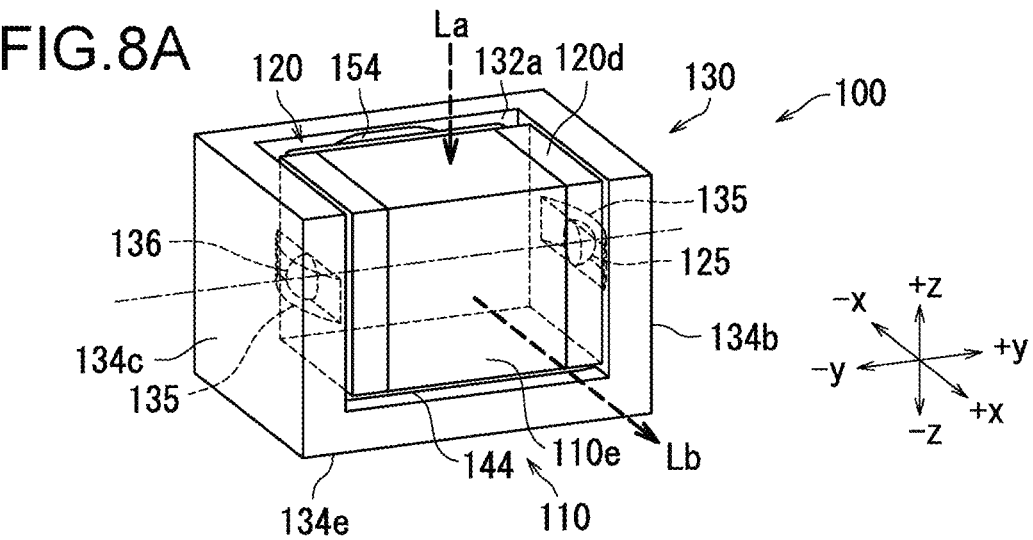
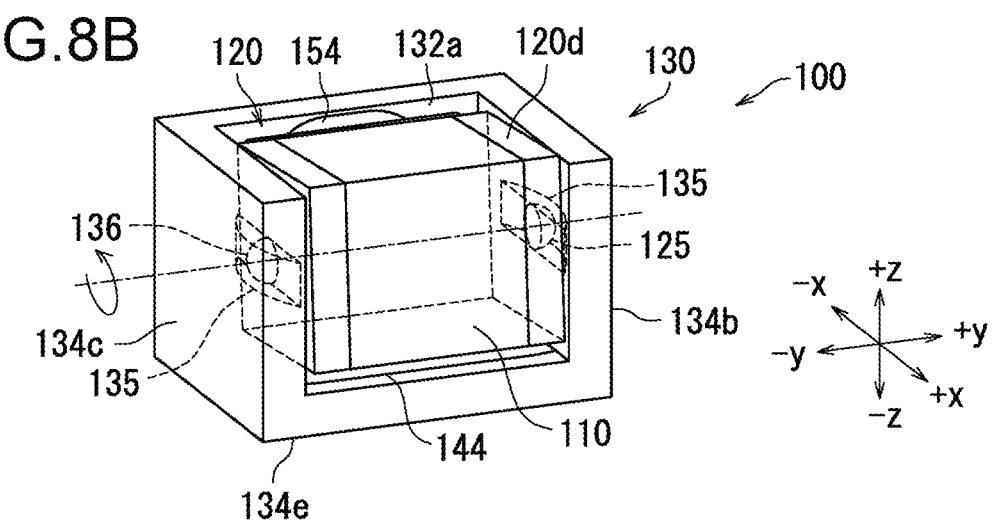
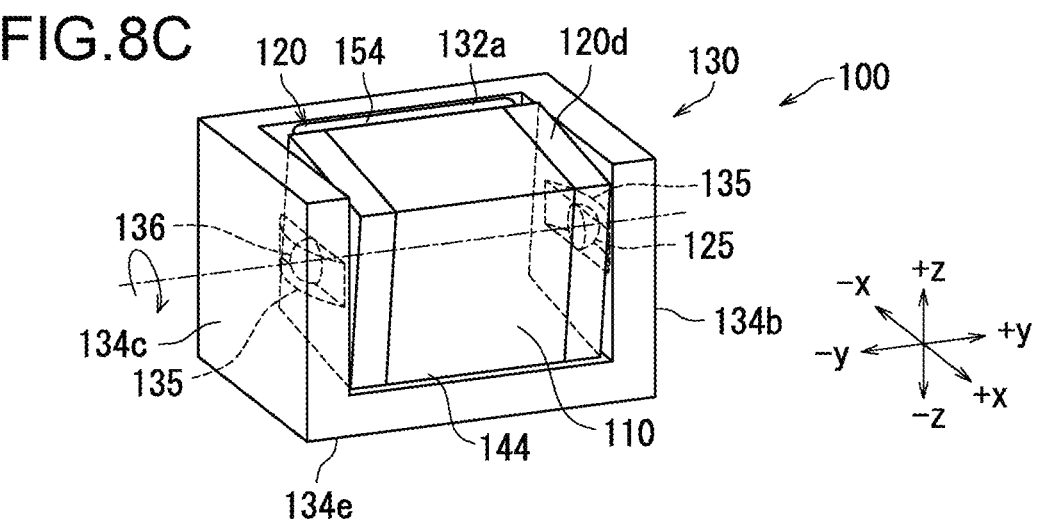

OPTICAL UNIT

CROSS-REFERENCE TO RELATED APPLICATIONS

The present invention claims priority under 35 U.S.C. § 119 to Japanese Patent Application No. 2020-051171 filed on Mar. 23, 2020, the entire content of which is incorporated herein by reference.

FIELD OF THE INVENTION

The present disclosure relates to an optical unit.

BACKGROUND

When capturing a still image or moving image with a camera, image blur sometimes occurs due to camera shake. For this reason, an image stabilization device has been put into practical use to enable clear imaging with image blur prevention. When the camera shakes, the image stabilization device can solve problems caused by the camera shake by correcting the position and orientation of a camera module according to the camera shake.

Additionally, in order to downsize the camera module, a folded zoom camera module equipped with various lens groups and prisms is known, and it is also considered to solve problems caused by camera shake of the folded zoom camera module. Conventionally, a vibration isolator mechanism for rotating a prism by rotating an X-axis member and a Y-axis member using motors and gears has been known.

However, in the conventional vibration isolator mechanism, the prism is rotated by rotating two rotating shafts by motors and gears, and displacement of the optical axis cannot be curbed by a simple configuration.

SUMMARY

An exemplary embodiment of the present disclosure includes an optical element, a holder, a case, a first swing mechanism, and a second swing mechanism. The optical element has a reflecting surface that reflects light in a first axis direction. The holder holds the optical element. The case swingably supports the holder. The first swing mechanism swings the holder with respect to the case with reference to a second axis direction orthogonal to the first axis direction. The second swing mechanism swings the holder with respect to the case with reference to a third axis direction orthogonal to each of the first axis direction and the second axis direction. The holder has a first protrusion and a second protrusion. The first protrusion is provided on a first case facing surface facing the case, and projects toward the case. The second protrusion is provided on a second case facing surface facing the case, and projects toward the case. The case has a first recess and a second recess. The first recess is provided on a first holder facing surface facing the first case facing surface of the holder, and accommodates at least a part of the first protrusion. The second recess is provided on a second holder facing surface facing the second case facing surface of the holder, and accommodates at least a part of the second protrusion. The first recess has a first side surface, a second side surface, and a bottom surface. The first side surface is located on one side in the third axis direction of the first protrusion. The second side surface is located on the other side in the third axis direction of the first protrusion. The bottom surface connects the first side surface of the first recess and the second side surface of the first recess. The second recess has a first side surface, a second side surface, and a bottom surface. The first side surface is located on one side in the third axis direction of the second protrusion. The second side surface is located on the other side in the third axis direction of the second protrusion. The bottom surface connects the first side surface of the second recess and the second side surface of the second recess.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 8A to 8C are schematic diagrams for describing swinging by the first swing mechanism of the optical unit of the present embodiment;

DETAILED DESCRIPTION

Figure 1:
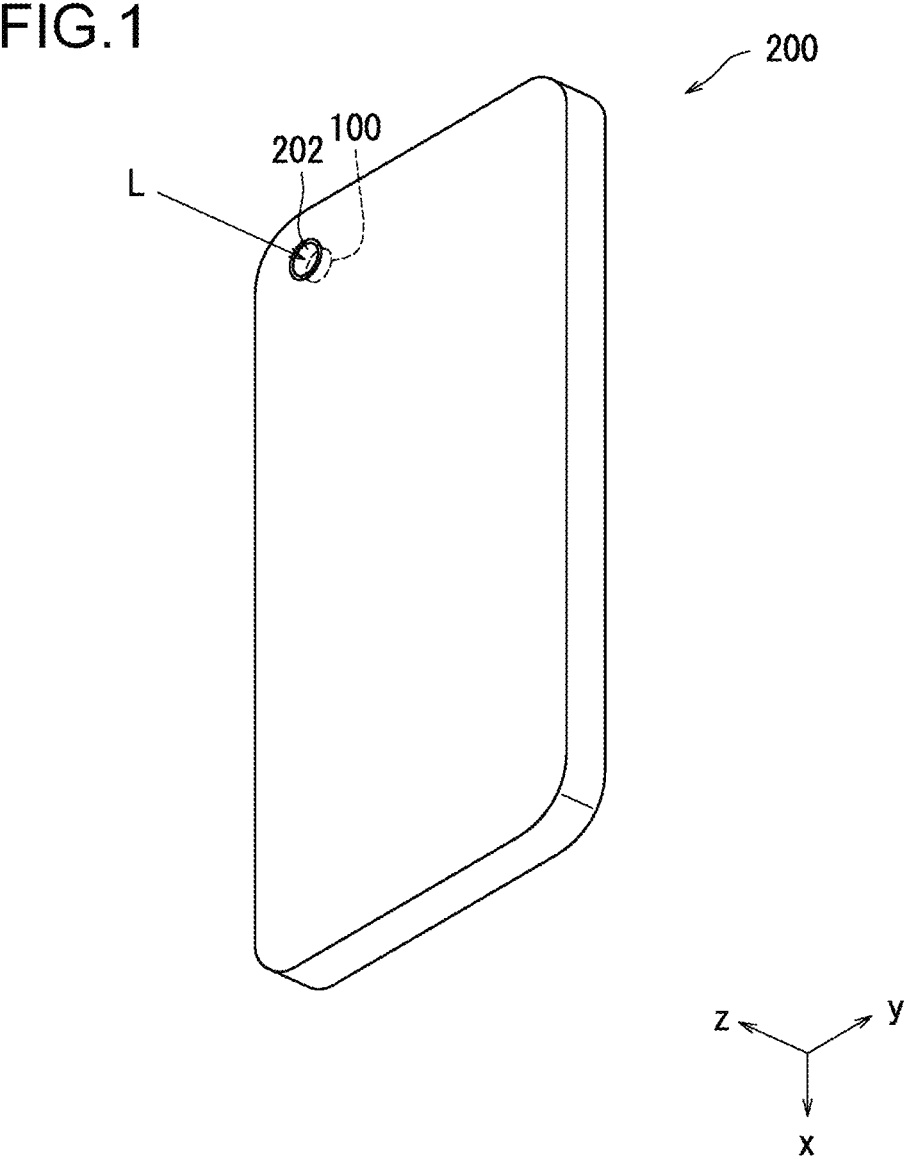
FIG. 1 is a schematic perspective view of a smartphone including an optical unit of the present embodiment.

Hereinafter, an embodiment of an optical unit according to the present disclosure will be described with reference to the drawings. Note that in the drawings, the same or corresponding parts will be denoted by the same reference symbols and description thereof will not be repeated. Note that in the specification of the present application, an x-axis, a y-axis, and a z-axis that are orthogonal to one another may be described in order to facilitate understanding of the disclosure.

An optical unit 100 reflects incident light in a specific direction. The optical unit 100 is suitably used as an optical component of a smartphone, for example.

First, a smartphone 200 including the optical unit 100 of the present embodiment will be described with reference to FIG. 1. FIG. 1 is a schematic perspective view of the smartphone 200 including the optical unit 100 of the present embodiment.

The optical unit 100 can be configured to be thin. As a result, the length (thickness) of the smartphone 200 along the z-axis direction can be reduced. Note that the application of the optical unit 100 is not limited to the smartphone 200, and the optical unit 100 can be used in various devices such as cameras and videos without particular limitation.

As shown in FIG. 1, the smartphone 200 includes a lens 202 through which light is incident. In the smartphone 200, the optical unit 100 is arranged on the inner side of the lens 202. Light L is incident on the smartphone 200 from the outside through the lens 202 in the incident direction, and a subject image is captured on the basis of light that has passed through the optical unit 100.

Figure 2A:
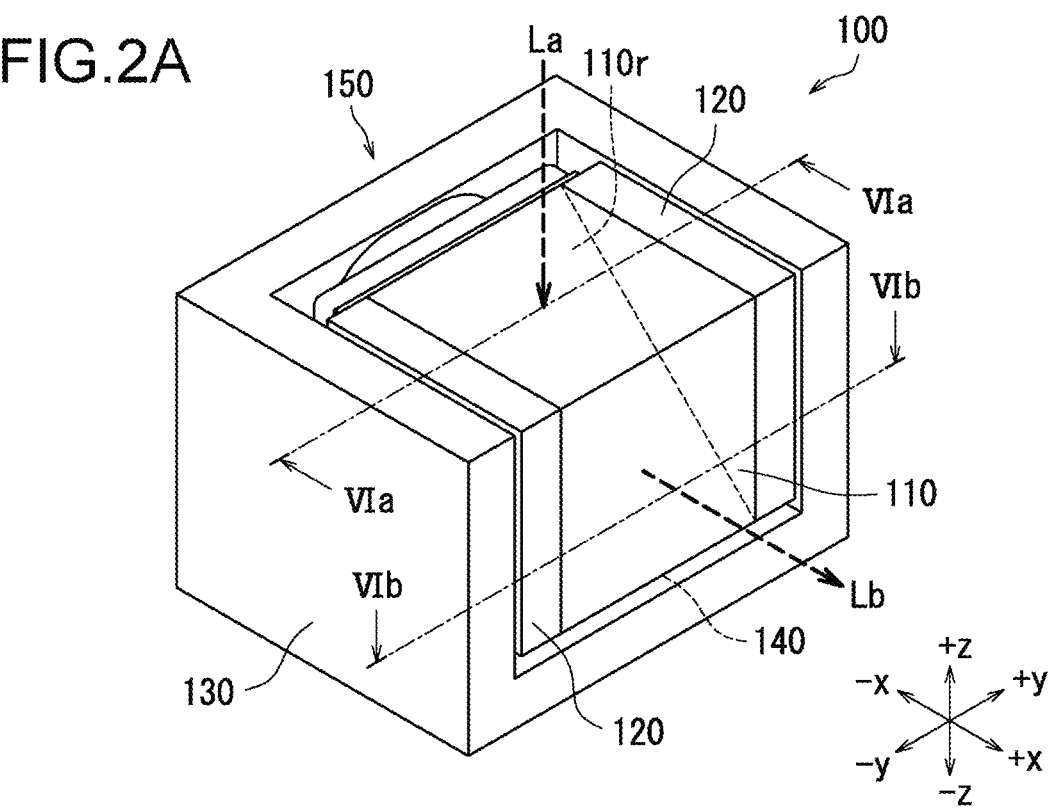
FIG. 2A is a schematic perspective view of the optical unit of the present embodiment.

Next, a configuration of the optical unit 100 of the present embodiment will be described with reference to FIGS. 2A and 2B. FIG. 2A is a schematic perspective view of the optical unit 100 of the present embodiment, and FIG. 2B is a schematic perspective view of the optical unit 100 of the present embodiment and a corresponding lens module 210 and image sensor 220.

Figure 2B:
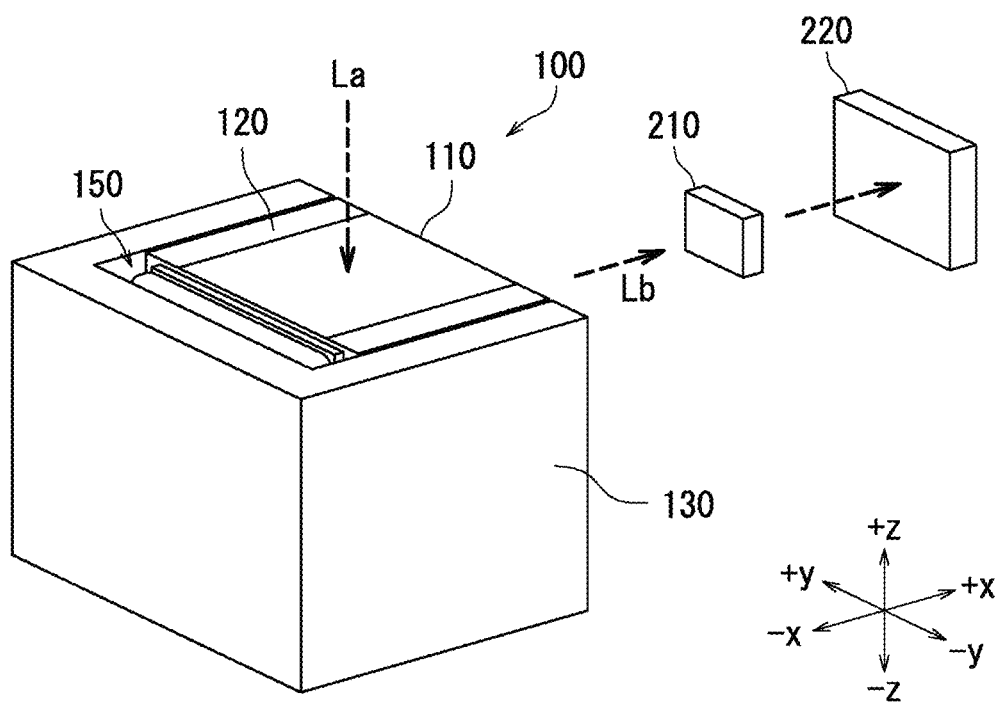
FIG. 2B is a schematic perspective view of the optical unit of the present embodiment and a corresponding lens module and image sensor.

As shown in FIGS. 2A and 2B, the optical unit 100 reflects incident light La incident along the z-axis direction as reflected light Lb in the x-axis direction. Note that in the present specification, the x-axis direction, the y-axis direction, and the z-axis direction may be referred to as a first axis direction, a second axis direction, and a third axis direction, respectively.

The optical unit 100 includes an optical element 110, a holder 120, a case 130, a first swing mechanism 140, and a second swing mechanism 150. Note that as shown in FIGS. 2A and 2B, while the second swing mechanism 150 is located on the −x direction side of the optical element 110, the first swing mechanism 140 is not visible from the outside of the optical unit 100. The first swing mechanism 140 is located on the −z direction side of the optical element 110 and the holder 120.

The optical element 110 has a reflecting surface 110r that reflects light in the x-axis direction. The reflecting surface 110r is arranged obliquely with respect to each of the xy plane and the yz plane. The reflecting surface 110r reflects the incident light La incident along the −z axis direction as the reflected light Lb in the +x axis direction.

For example, the optical element 110 includes a prism. The prism is made of a substantially single transparent material that has a higher refractive index than air. Since the optical element 110 includes a prism, the length of the optical path passing through the optical unit 100 can be shortened.

The holder 120 holds the optical element 110. The holder 120 holds the optical element 110 from surfaces located on both sides of the optical element 110 in the y-axis direction and a surface located on the −z-axis direction side of the optical element 110. Typically, the holder 120 is made of resin.

The case 130 swingably supports the holder 120. The case 130 supports the holder 120 from both side end portions in the y-axis direction. The holder 120 swings with respect to the case 130. The holder 120 swings with respect to the case 130 with reference to the y-axis. The y-axis is also referred to as a pitching axis. Additionally, the holder 120 swings with respect to the case 130 with reference to the z-axis. The z-axis is also referred to as a yawing axis. On the other hand, in the optical unit 100, swinging of the holder 120 with respect to the case 130 with reference to the x-axis is curbed. Typically, the case 130 is made of resin or metal.

The first swing mechanism 140 is located on the −z direction side of the holder 120. The first swing mechanism 140 swings the holder 120 with respect to the case 130 with reference to the y-axis direction.

Additionally, the second swing mechanism 150 is located on the −x direction side of the holder 120. The second swing mechanism 150 swings the holder 120 with respect to the case 130 with reference to the z-axis direction.

As shown in FIG. 2B, the optical unit 100 reflects the incident light La incident along the z-axis direction as the reflected light Lb in the x-axis direction. Thereafter, the reflected light Lb is received by the image sensor 220 through the lens module 210 of the smartphone 200. The lens module 210 may include various lenses depending on the application.

In the optical unit 100 of the present embodiment, the holder 120 is swingably supported with respect to the case 130. The holder 120 can swing with respect to the case 130 with reference to the y-axis and the z-axis, but swinging with reference to the x-axis is curbed.

Figure 3A:
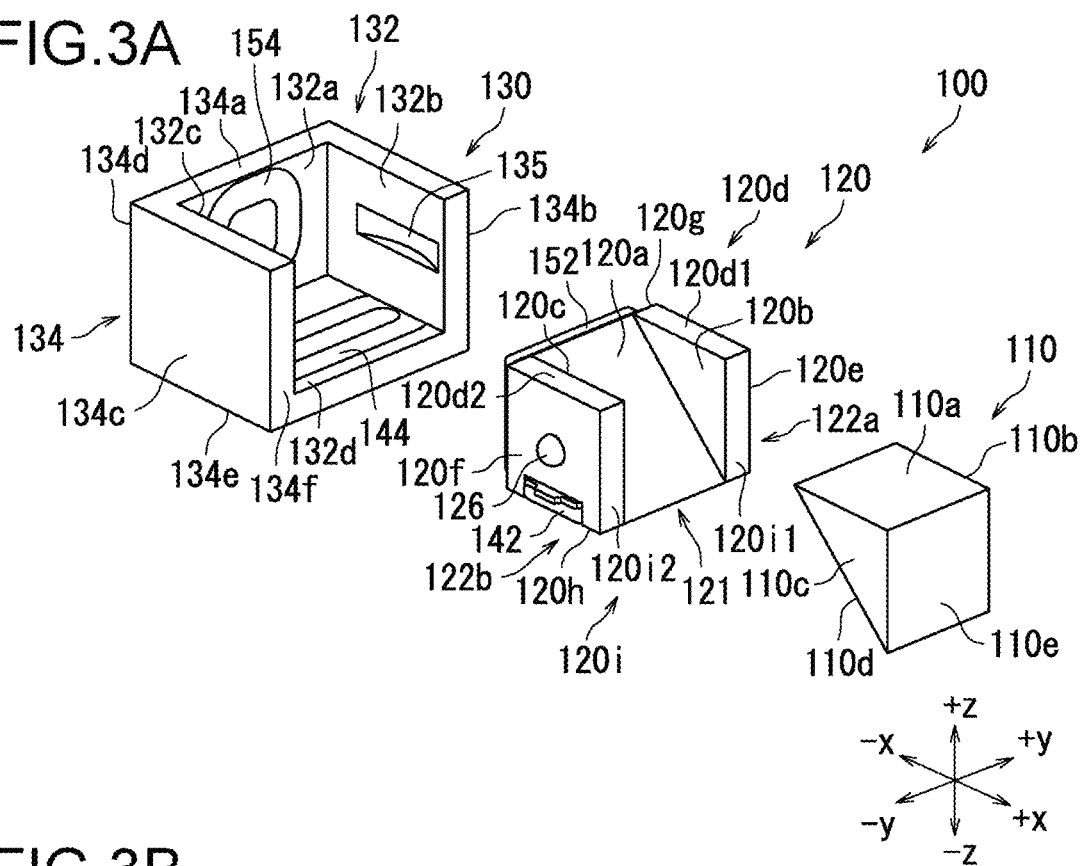
FIGS. 3A and 3B are schematic exploded perspective views of the optical element, a holder, and a case of the optical unit of the present embodiment.
Figure 3B:
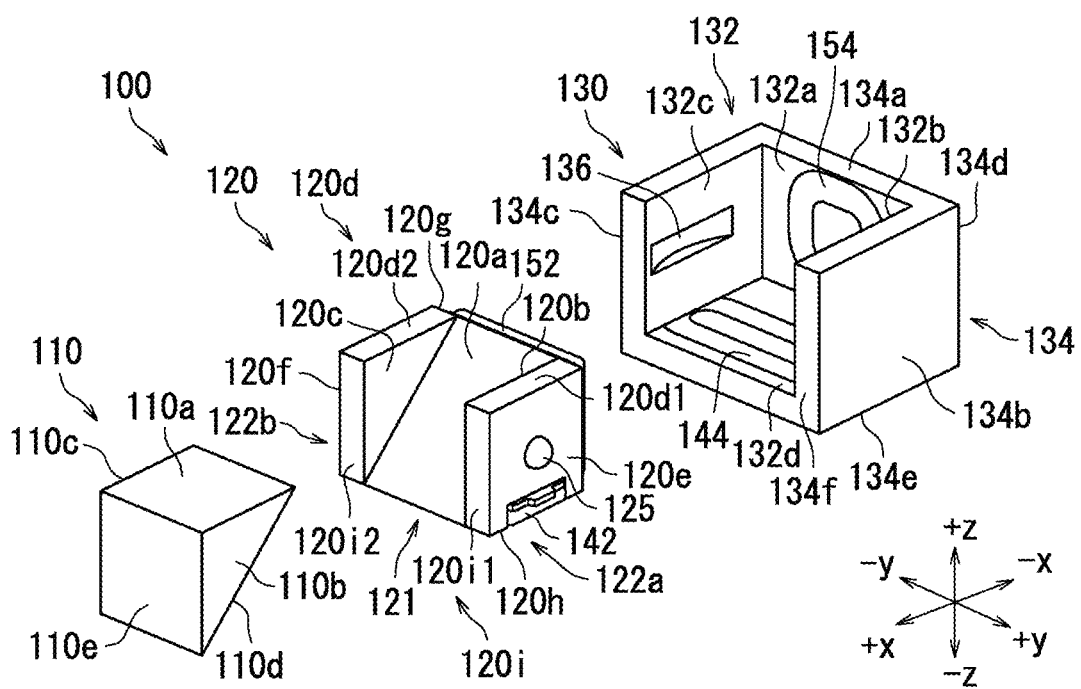

Next, a configuration of the optical unit 100 of the present embodiment will be described with reference to FIGS. 3A and 3B. FIGS. 3A and 3B are exploded perspective views of the optical element 110, the holder 120, and the case 130 of the optical unit 100 of the present embodiment.

As can be seen from FIG. 3A, the optical element 110 is mounted on the holder 120. Additionally, the holder 120 is mounted on the case 130 together with the optical element 110.

As shown in FIGS. 3A and 3B, the optical element 110 has a substantially triangular prism shape. The optical element 110 has a surface 110a, a surface 110b, a surface 110c, a surface 110d, and a surface 110e. The normal of the surface 110a is parallel to the z-axis direction and points in the +z direction.

The surface 110b is connected to the surface 110a and is orthogonal to the surface 110a. The normal of the surface 110b is parallel to the y-axis direction and points in the +y direction. The surface 110c is connected to the surface 110a and is orthogonal to the surface 110a. The normal of the surface 110c is parallel to the y-axis direction and points in the −y direction.

The surface 110d is connected to the surfaces 110a, 110b, and 110c. The surface 110d intersects the xy plane at an angle. Here, the surface 110d is the reflecting surface 110r of FIGS. 2A and 2B. The surface 110e is connected to the surfaces 110a, 110b, 110c, and 110d, and is orthogonal to the surfaces 110a, 110b, and 110c. The normal of the surface 110e is parallel to the x-axis direction and points in the +x direction.

The holder 120 has a substantially rectangular parallelepiped shape with a part of the central portion removed. The holder 120 has a surface 120a, a surface 120b, a surface 120c, a surface 120d, a surface 120e, a surface 120f, a surface 120g, a surface 120h and a surface 120i.

The surface 120a intersects the xy plane at an angle. The length of the surface 120a in the y direction is approximately equal to the length of the optical element 110 in the y direction, but the length of the surface 120a in the y direction is slightly larger than the length of the optical element 110 in the y direction.

The surface 120b is connected to the surface 120a and is orthogonal to the surface 120a. The normal of the surface 120b is parallel to the y-axis direction and points in the −y direction. The surface 120c faces the surface 120b. The surface 120c is connected to the surface 120a and is orthogonal to the surface 120a. The normal of the surface 120c is parallel to the y-axis direction and points in the +y direction.

The optical element 110 is mounted on the surfaces 120a, 120b, and 120c of the holder 120. The surfaces 120a, 120b, and 120c form an inner peripheral surface of the holder 120. Additionally, the optical element 110 is attached to the surface 120a of the holder 120. In the present specification, the surface 120a of the holder 120 may be referred to as an optical element attachment surface.

The normal of the surface 120d is parallel to the z-axis direction and points in the +z direction. The surface 120d is divided into a surface 120d1 and a surface 120d2 by the surface 120a. The surface 120d1 is located on the +y direction side of the surface 120a, and the surface 120d2 is located on the −y direction side of the surface 120a.

The surface 120e is connected to the surface 120d1 and is orthogonal to the surface 120d1. The normal of the surface 120e is parallel to the y-axis direction and points in the +y direction. When the holder 120 is mounted on the case 130, the surface 120e of the holder 120 faces the case 130. In the present specification, the surface 120e of the holder 120 may be referred to as a first case facing surface.

The surface 120f is connected to the surface 120d2 and is orthogonal to the surface 120d2. The normal of the surface 120f is parallel to the y-axis direction and points in the −y direction. When the holder 120 is mounted on the case 130, the surface 120f of the holder 120 faces the case 130. In the present specification, the surface 120f of the holder 120 may be referred to as a second case facing surface.

The surface 120g is connected to the surfaces 120a, 120d1, 120d2, 120e, and 120f, and is orthogonal to the surfaces 120d1, 120d2, 120e, and 120f. The normal of the surface 120g is parallel to the x-axis direction and points in the −x direction. The surface 120h is connected to the surfaces 120e, 120f, and 120g, and is orthogonal to the surfaces 120e, 120f, and 120g. The normal of the plane 120h is parallel to the z-axis direction and points in the −z direction.

The normal of the surface 120i is parallel to the x-axis direction and points in the +x direction. The surface 120i is connected to the surfaces 120d, 120e, 120f, and 120h, and is orthogonal to the surfaces 120d, 120e, 120f, and 120h. The surface 120i is divided into a surface 120i1 and a surface 120i2 by the surface 120a. The surface 120i1 is located on the +y direction side of the surface 120a, and the surface 120i2 is located on the −y direction side of the surface 120a.

As shown in FIGS. 3A and 3B, the holder 120 has an attachment portion 121, a first end portion 122a, a second end portion 122b, a first protrusion 125, and a second protrusion 126. The optical element 110 is attached to the attachment portion 121. The first end portion 122a is located on the +y direction side of the attachment portion 121. The second end portion 122b is located on the −y direction side of the attachment portion 121. The attachment portion 121 is located between the first end portion 122a and the second end portion 122b.

The surface 120e is an outer surface of the first end portion 122a on the +y direction side. As described above, the surface 120e is the first case facing surface facing the case 130. The first protrusion 125 is provided on the first case facing surface (surface 120e) facing the case 130. Here, the first protrusion 125 is located at the center of the first case facing surface (surface 120e). When the holder 120 is mounted on the case 130, the first protrusion 125 projects toward the case 130.

The surface 120f is an outer surface of the second end portion 122b on the −y direction side. As described above, the surface 120f is the second case facing surface facing the case 130. The second protrusion 126 is provided on the second case facing surface (surface 120f) facing the case 130. Here, the second protrusion 126 is located at the center of the second case facing surface (surface 120f) When the holder 120 is mounted on the case 130, the second protrusion 126 projects toward the case 130.

The case 130 has a substantially rectangular parallelepiped shape in which a smaller substantially rectangular parallelepiped shape is partially removed from two surfaces adjacent to the holder 120. The case 130 has an inner peripheral surface 132 and an outer peripheral surface 134. The inner peripheral surface 132 has a surface 132a, a surface 132b, a surface 132c, and a surface 132d. The normal of the surface 132a is parallel to the x-axis direction and points in the +x direction.

The surface 132b is connected to the surface 132a and is orthogonal to the surface 132a. The normal of the surface 132b is parallel to the y-axis direction and points in the −y direction. The surface 132c is connected to the surface 132a and is orthogonal to the surface 132a. The normal of the surface 132c is parallel to the y-axis direction and points in the +y direction.

The surface 132d is connected to the surfaces 132a, 132b, and 132c, and is orthogonal to the surfaces 132a, 132b, and 132c. The normal of the surface 132d is parallel to the z-axis direction and points in the +z direction.

The holder 120 is mounted on the inner peripheral surface 132 of the case 130. When the holder 120 is mounted on the inner peripheral surface 132 of the case 130, the surfaces 120g, 120e, 120f, and 120h of the holder 120 face the surfaces 132a, 132b, 132c, 132d of the case 130, respectively.

As described above, in the present specification, the surface 120e of the holder 120 may be referred to as the first case facing surface, and the surface 120f of the holder 120 may be referred to as the second case facing surface. Note that in the present specification, of the case 130, the surface 132b corresponding to the surface 120e of the holder 120 may be referred to as a first holder facing surface, and the surface 132c corresponding to the surface 120f of the holder 120 may be referred to as a second holder facing surface.

The outer peripheral surface 134 has a surface 134a, a surface 134b, a surface 134c, a surface 134d, a surface 134e, and a surface 134f. The normal of the surface 134a is parallel to the z-axis direction and points in the +z direction. The surface 134a is connected to each of the surfaces 132a, 132b, and 132c, and is orthogonal to the surfaces 132a, 132b, and 132c.

The surface 134b is connected to the surface 134a and is orthogonal to the surface 134a. The normal of the surface 134b is parallel to the y-axis direction and points in the +y direction. The surface 134c is connected to the surface 134a and is orthogonal to the surface 134a. The normal of the surface 134c is parallel to the y-axis direction and points in the −y direction.

The surface 134d is connected to the surfaces 134a, 134b, and 134c, and is orthogonal to the surfaces 134a, 134b, and 134c. The normal of the surface 134d is parallel to the x-axis direction and points in the −x direction. The surface 134e is connected to the surfaces 134b, 134c, and 134d, and is orthogonal to the surfaces 134b, 134c, and 134d. The normal of the surface 134e is parallel to the z-axis direction and points in the −z direction.

The surface 134f is connected to the surfaces 134b, 134c, and 134e, and is orthogonal to the surfaces 134b, 134c, and 134e. Additionally, the surface 134f is connected to each of the surfaces 132a, 132b, and 132c, and is orthogonal to the surfaces 132a, 132b, and 132c. The normal of the surface 134f is parallel to the x-axis direction and points in the +x direction.

The case 130 has a first recess 135. The first recess 135 is provided on the first holder facing surface (132b) facing the first case facing surface (120e) of the holder 120. The first recess 135 accommodates at least a part of the first protrusion 125. Here, the first recess 135 extends in the x-axis direction. The length of the first recess 135 in the x-axis direction is larger than the length of the first protrusion 125 in the x-axis direction.

The case 130 has a second recess 136. The second recess 136 is provided on the second holder facing surface (132c) facing the second case facing surface (120f) of the holder 120. The second recess 136 accommodates at least a part of the second protrusion 126. Here, the second recess 136 extends in the x-axis direction. The length of the second recess 136 in the x-axis direction is larger than the length of the second protrusion 126 in the x-axis direction.

According to the optical unit 100 of the present embodiment, when the holder 120 is mounted on the case 130, the first protrusion 125 projects toward the case 130 from the first end portion 122a. Additionally, the first case facing surface (surface 120e) provided with the first protrusion 125 faces the first holder facing surface (surface 132b) provided with the first recess 135, and the first recess 135 accommodates at least a part of the first protrusion 125. Hence, the first protrusion 125 is movable in the first recess 135 in which it is accommodated.

Similarly, the second protrusion 126 projects toward the case 130 from the second end portion 122b. Additionally, the second case facing surface (surface 120f) provided with the second protrusion 126 faces the second holder facing surface (surface 132c) provided with the second recess 136, and the second recess 136 accommodates at least a part of the second protrusion 126. Hence, the second protrusion 126 is movable in the second recess 136 in which it is accommodated.

Figure 4A:
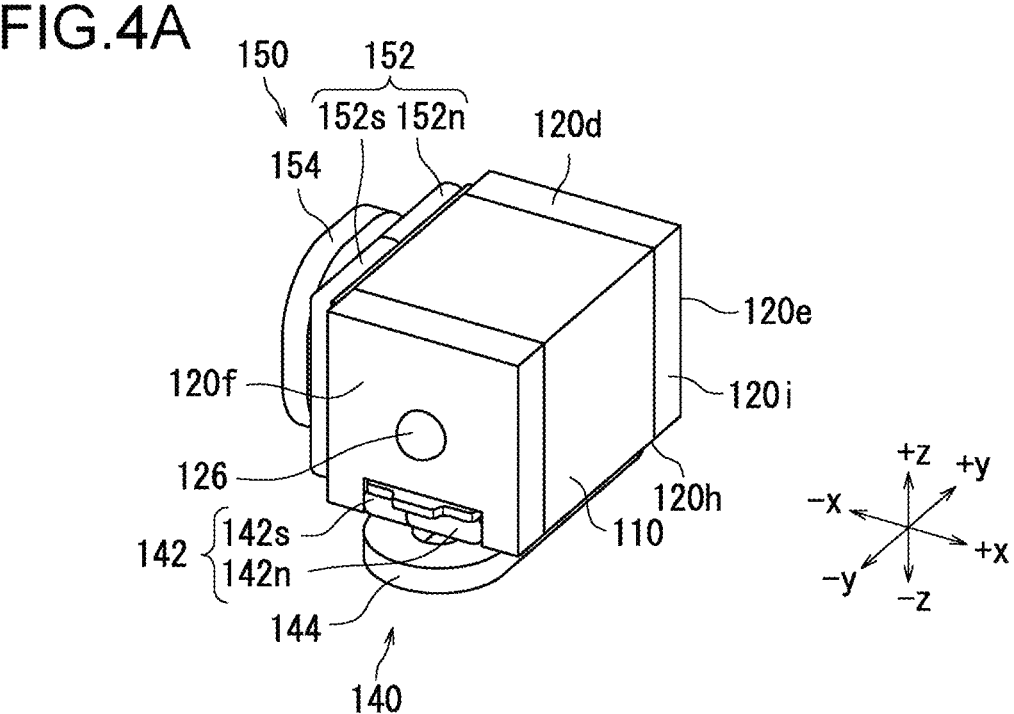
FIGS. 4A and 4B are schematic perspective views of the case, a first swing mechanism, and a second swing mechanism of the optical unit of the present embodiment.
Figure 4B:
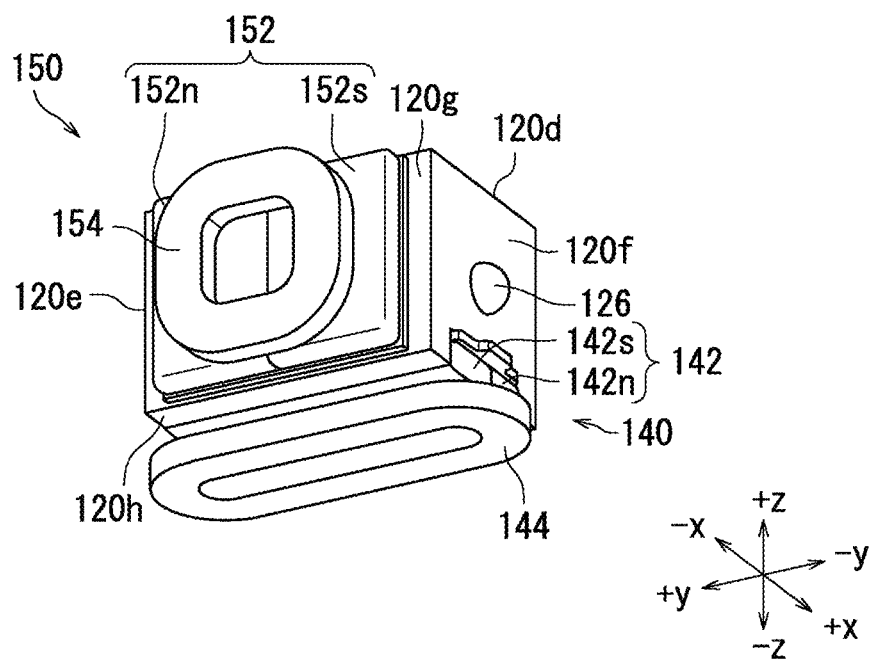

Next, the holder 120, the first swing mechanism 140, and the second swing mechanism 150 of the optical unit 100 of the present embodiment will be described with reference to FIGS. 3A, 3B and 4. FIGS. 4A and 4B are schematic perspective views of the holder 120, the first swing mechanism 140, and the second swing mechanism 150 of the optical unit 100 of the present embodiment. Note that in FIGS. 4A and 4B, the case 130 is omitted except for a first coil 144 and a second coil 154.

The first swing mechanism 140 includes a first magnet 142 and the first coil 144. The first magnet 142 is provided on one of the holder 120 and the case 130, and the first coil 144 is provided on the other of the holder 120 and the case 130 so as to correspond to the first magnet 142. Specifically, one of the first magnet 142 and the first coil 144 is provided on the surface 120h of the holder 120, and the other of the first magnet 142 and the first coil 144 is arranged on the surface 132d of the case 130 or inside the case 130 so as to face the surface 132d. In the present specification, the surface 120h of the holder 120 may be referred to as a first swing mechanism attachment surface.

Here, the first magnet 142 is attached to the holder 120. Specifically, the first magnet 142 is attached to the surface 120h of the holder 120. The first magnet 142 has an N pole 142n and an S pole 142s. The N pole 142n and the S pole 142s each extend in the y direction and are arranged side by side in the x direction.

The first coil 144 is provided in the case 130. By switching the direction of the current flowing through the first coil 144, the first magnet 142 receives a force along the x-axis direction.

The second swing mechanism 150 includes a second magnet 152 and the second coil 154. The second magnet 152 is provided on one of the holder 120 and the case 130, and the second coil 154 is provided on the other of the holder 120 and the case 130 so as to correspond to the second magnet 152. Specifically, one of the second magnet 152 and the second coil 154 is provided on the surface 120g of the holder 120, and the other of the second magnet 152 and the second coil 154 is arranged on the surface 132a of the case 130 or inside the case 130 so as to face the surface 132a. In the present specification, the surface 120g of the holder 120 may be referred to as a second swing mechanism attachment surface.

Here, the second magnet 152 is attached to the holder 120. Specifically, the second magnet 152 is attached to the surface 120g of the holder 120. The second magnet 152 has an N pole 152n and an S pole 152s. The N pole 152n and the S pole 152s each extend in the z direction and are arranged side by side in the y direction.

The second coil 154 is provided in the case 130. By switching the direction of the current flowing through the second coil 154, the second magnet 152 receives a force along the y-axis direction.

As shown in FIGS. 4A and 4B, it is preferable that the holder 120 includes the first magnet 142 and the second magnet 152, and the case 130 includes the first coil 144 and the second coil 154. As a result, swinging of the holder 120 with respect to the case 130 can be easily controlled by passing a current through the first coil 144 and/or the second coil 154 of the case 130.

As described above, the first swing mechanism attachment surface (surface 120h) is connected to the first case facing surface (surface 120e) and the second case facing surface (surface 120f). Additionally, the first swing mechanism attachment surface (surface 120h) has a normal parallel to the z-axis direction. Additionally, the second swing mechanism attachment surface (surface 120g) is connected to the first case facing surface (surface 120e) and the second case facing surface (surface 120f). The second swing mechanism attachment surface (surface 120g) has a normal parallel to the x-axis direction.

One of the first magnet 142 and the first coil 144 of the first swing mechanism 140 is attached to the first swing mechanism attachment surface (surface 120h). Similarly, one of the second magnet 152 and the second coil 154 of the second swing mechanism 150 is attached to the second swing mechanism attachment surface (surface 120g). Since the first swing mechanism 140 and the second swing mechanism 150 are attached to attachment surfaces (surfaces 120h, 120g) having normals parallel to the x-axis direction and the y-axis direction, the holder 120 can be swung efficiently with respect to the case 130.

Additionally, as described above, the optical element 110 is located on the optical element attachment surface (surface 120a) of the holder 120. The optical element attachment surface (surface 120a) is located between the first case facing surface (surface 120e) and the second case facing surface (surface 120f). Additionally, the optical element attachment surface (surface 120a) is arranged obliquely with respect to the first swing mechanism attachment surface (surface 120h) and the second swing mechanism attachment surface (surface 120g). Hence, it is possible to effectively curb displacement of the optical axis of the reflected light by the optical element 110 attached to the optical element attachment surface (surface 120a).

As described above, the first protrusion 125 of the holder 120 is accommodated in the first recess 135 of the case 130, and the second protrusion 126 of the holder 120 is accommodated in the second recess 136 of the case 130.

Figure 5A:
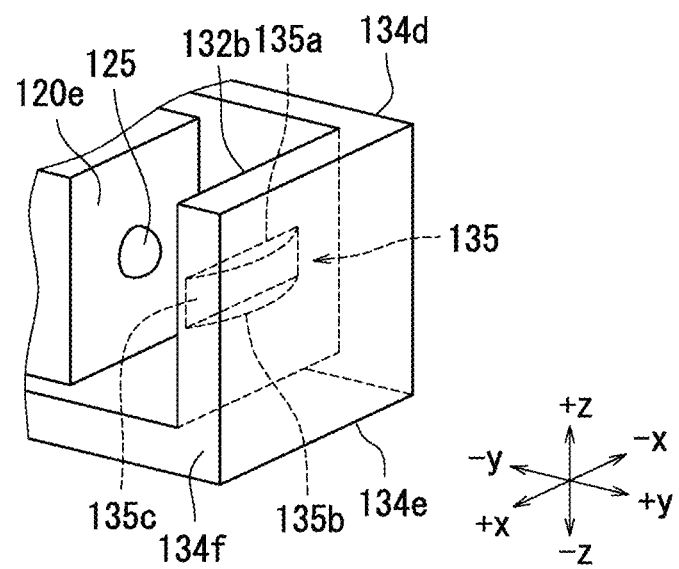
FIG. 5A is a schematic diagram for describing the engagement between a first protrusion of the holder and a first recess of the case of the optical unit of the present embodiment.

Here, the engagement of the protrusion of the holder 120 and the recess of the case 130 of the optical unit 100 of the present embodiment will be described with reference to FIGS. 5A and 5B. First, the engagement of the first protrusion 125 of the holder 120 and the first recess 135 of the case 130 of the optical unit 100 will be described. FIG. 5A is a schematic diagram for describing the engagement between the first protrusion 125 of the holder 120 and the first recess 135 of the case 130 of the optical unit 100 of the present embodiment.

As shown in FIG. 5A, the first protrusion 125 projects from the surface 120e of the holder 120. The first protrusion 125 has a partially spherical shape. Here, the first protrusion 125 has a hemispherical shape. Note, however, that the first protrusion 125 does not have to have a hemispherical shape. The first protrusion 125 preferably has a curved surface shape. In one example, the first protrusion 125 may have a shape in which a round surface is provided around a rectangular plane.

As described above, the first recess 135 accommodates at least a part of the first protrusion 125. The first recess 135 has a first side surface 135a, a second side surface 135b, and a bottom surface 135c. The first side surface 135a is located on one side in the z-axis direction of the first protrusion 125. The second side surface 135b is located on the other side in the z-axis direction of the first protrusion 125. The bottom surface 135c connects the first side surface 135a of the first recess 135 and the second side surface 135b of the first recess 135.

Here, the first side surface 135a extends parallel to the x-axis direction. The second side surface 135b extends parallel to the x-axis direction. The first side surface 135a and the second side surface 135b are parallel to each other.

Additionally, the boundary between the first side surface 135a and the bottom surface 135c is arcuate, and the boundary between the second side surface 135b and the bottom surface 135c is also arcuate. Hence, the depth of the bottom surface 135c (distance to bottom surface 135c from surface 132b) changes depending on the location in the x direction. The bottom surface 135c is the deepest at the center of the first side surface 135a in the x direction.

The bottom surface 135c preferably has a partially spherical shape. Here, the bottom surface 135c has a curved surface shape when viewed from the front in the z-axis direction. The curved surface of the bottom surface 135c may be defined by a constant radius of curvature. The curved surface of the bottom surface 135c matches the shape of the first protrusion 125.

Next, the engagement of the second protrusion 126 of the holder 120 and the second recess 136 of the case 130 of the optical unit 100 will be described. FIG. 5B is a schematic diagram for describing the engagement between the second protrusion 126 of the holder 120 and the second recess 136 of the case 130 of the optical unit 100 of the present embodiment.

Figure 5B:
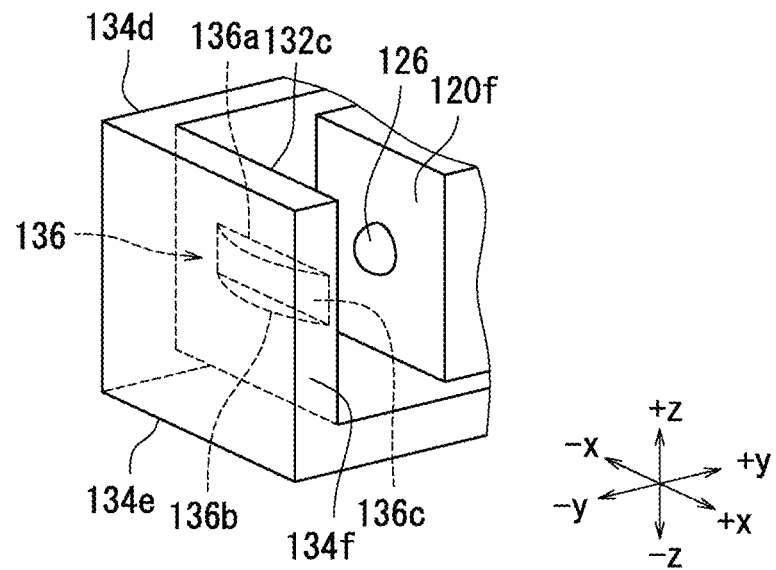
FIG. 5B is a schematic diagram for describing the engagement between a second protrusion of the holder and a second recess of the case of the optical unit of the present embodiment.

As shown in FIG. 5B, the second protrusion 126 projects from the surface 120f of the holder 120. The second protrusion 126 has a partially spherical shape. Here, the second protrusion 126 has a hemispherical shape. Note, however, that the second protrusion 126 does not have to have a hemispherical shape. The second protrusion 126 preferably has a curved surface shape. In one example, the second protrusion 126 may have a shape in which a round surface is provided around a rectangular plane.

As described above, the second recess 136 accommodates at least a part of the second protrusion 126. The second recess 136 has a first side surface 136a, a second side surface 136b, and a bottom surface 136c. The first side surface 136a is located on one side in the z-axis direction of the second protrusion 126. The second side surface 136b is located on the other side in the z-axis direction of the second protrusion 126. The bottom surface 136c connects the first side surface 136a of the second recess 136 and the second side surface 136b of the second recess 136.

Here, the first side surface 136a extends parallel to the x-axis direction. The second side surface 136b extends parallel to the x-axis direction. The first side surface 136a and the second side surface 136b are parallel to each other.

Additionally, the boundary between the first side surface 136a and the bottom surface 136c is arcuate, and the boundary between the second side surface 136b and the bottom surface 136c is also arcuate. Hence, the depth of the bottom surface 136c (distance to bottom surface 136c from surface 132c) changes depending on the location in the x direction. The bottom surface 136c is the deepest at the center of the first side surface 136a in the x direction.

The bottom surface 136c preferably has a partially spherical shape. Here, the bottom surface 136c has a curved surface shape when viewed from the front in the z-axis direction. The curved surface of the bottom surface 136c may be defined by a constant radius of curvature. The curved surface of the bottom surface 136c matches the shape of the second protrusion 126.

As can be seen from FIGS. 5A and 5B, the first recess 135 supports the first protrusion 125. At this time, the first protrusion 125 can swing with respect to the first recess 135 with reference to the y-axis direction and the z-axis direction, but swinging with reference to the x-axis direction is curbed. Similarly, the second recess 136 supports the second protrusion 126. At this time, the second protrusion 126 can swing with respect to the second recess 136 with reference to the y-axis direction and the z-axis direction, but swinging with reference to the x-axis direction is curbed.

According to the present embodiment, the optical unit 100 can swing with reference to two of the three axial directions orthogonal to one another (e.g., y-axis direction and z-axis direction), and swinging with reference to the remaining one axial direction (e.g., x-axis direction) is restricted. As a result, displacement of the optical axis of the reflected light can be curbed with a simple configuration.

Moreover, as described above, the first protrusion 125 has a partially spherical shape, and the bottom surface 135c of the first recess 135 accommodating the first protrusion 125 has a partially spherical shape. Similarly, the second protrusion 126 has a partially spherical shape, and the bottom surface 136c of the second recess 136 accommodating the second protrusion 126 has a partially spherical shape. Hence, the optical unit 100 can swing smoothly with reference to the y-axis direction and the z-axis direction.

Figure 6A:
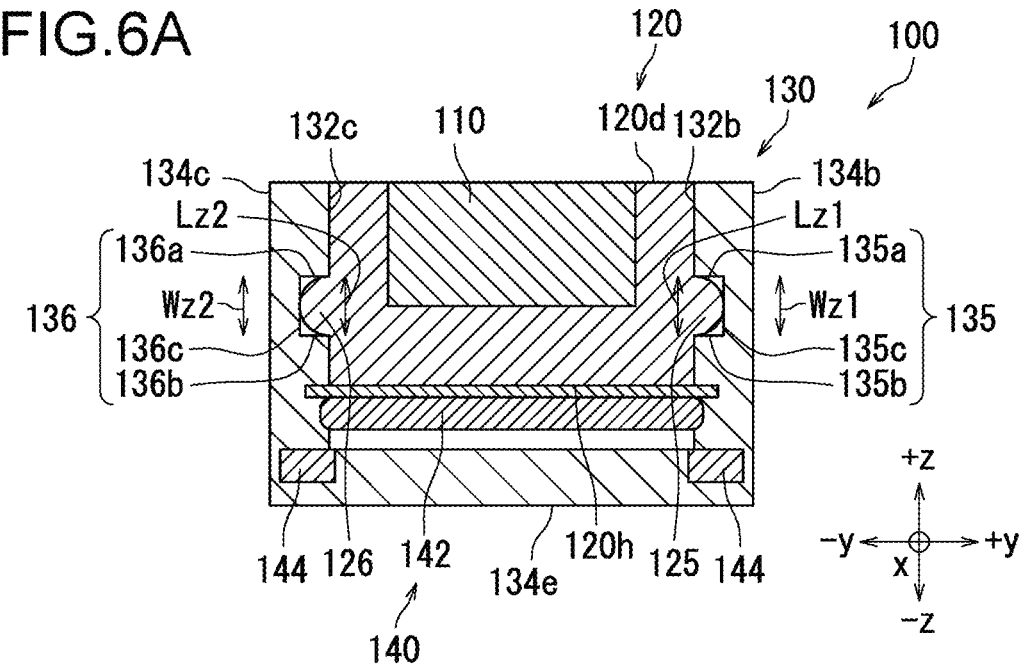
FIG. 6A is a sectional view taken along line VIa-VIa of FIG. 2A.
Figure 6B:
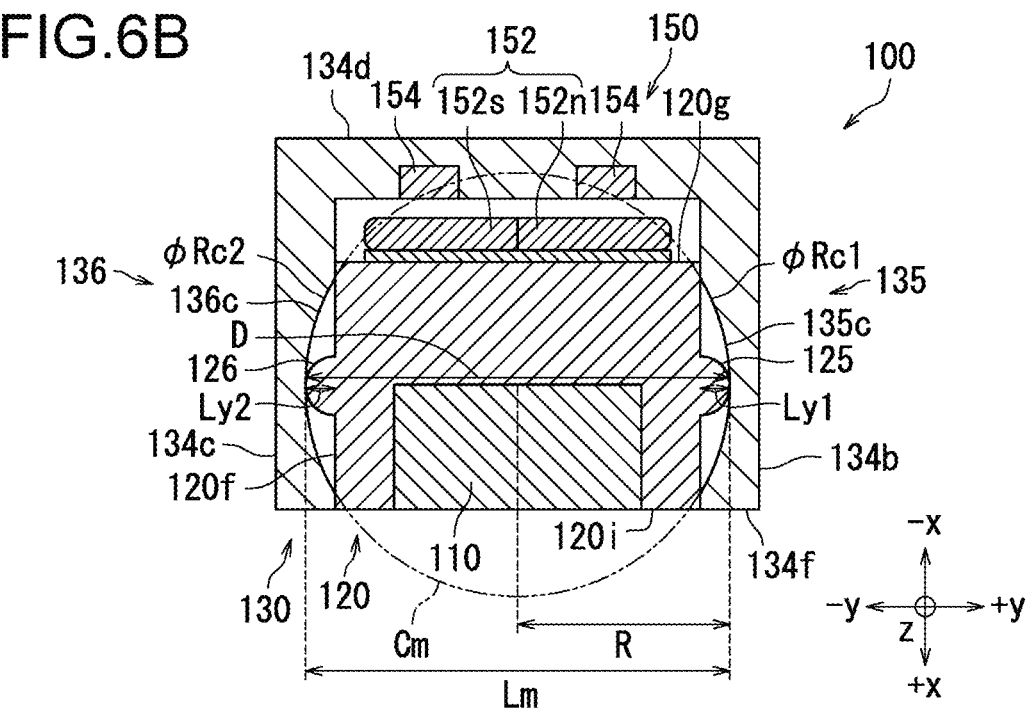
FIG. 6B is a sectional view taken along line VIb-VIb of FIG. 2A.

Next, a configuration in which the protrusion of the holder 120 and the recess of the case 130 of the optical unit 100 of the present embodiment are engaged will be described with reference to FIGS. 6A and 6B. First, a configuration in which the first protrusion 125 and the second protrusion 126 of the holder 120 are engaged with the first recess 135 and the second recess 136 of the case 130, respectively, in the optical unit 100 of the present embodiment will be described with reference to FIG. 6A. FIG. 6A is a sectional view taken along line VIa-VIa of FIG. 2A, and FIG. 6B is a sectional view taken along line VIb-VIb of FIG. 2A.

As shown in FIG. 6A, the first protrusion 125 is accommodated in the first recess 135, and the second protrusion 126 is accommodated in the second recess 136.

A width Wz1 of the first recess 135 along the z-axis direction is approximately equal to or slightly larger than a length Lz1 of the first protrusion 125 along the z-axis direction. The first recess 135 extends in the x-axis direction with the same width Wz1.

Similarly, a width Wz2 of the second recess 136 along the z-axis direction is approximately equal to or slightly larger than a length Lz2 of the second protrusion 126 along the z-axis direction. The second recess 136 extends in the x-axis direction with the same width Wz2.

Here, the width Wz2 of the second recess 136 is substantially equal to the width Wz1 of the first recess 135. Additionally, the location of the second recess 136 on the surface 132c of the case 130 is substantially equal to the location of the first recess 135 on the surface 132b of the case 130.

The first protrusion 125 and the second protrusion 126 are rotatable with reference to the y-axis direction. Here, since the first protrusion 125 and the second protrusion 126 both have a hemispherical shape, the holder 120, together with the first protrusion 125 and the second protrusion 126, can smoothly rotate with reference to the y-axis direction.

On the other hand, the width Wz1 of the first recess 135 is substantially equal to or slightly larger than the length Lz1 of the first protrusion 125. Additionally, the width Wz2 of the second recess 136 is substantially equal to or slightly larger than the length Lz2 of the second protrusion 126. Hence, the holder 120 cannot swing with reference to the x-axis direction. Even if the holder 120 receives a force that rotates clockwise with reference to the x-axis direction, the first protrusion 125 comes into contact with the second side surface 135b of the first recess 135 and the second protrusion 126 comes into contact with the first side surface 136a of the second recess 136. Hence, the holder 120 cannot rotate clockwise. Similarly, even if the holder 120 receives a force that rotates counterclockwise with reference to the x-axis direction, the first protrusion 125 comes into contact with the first side surface 135a of the first recess 135 and the second protrusion 126 comes into contact with the second side surface 136b of the second recess 136. Hence, the holder 120 cannot rotate counterclockwise.

Additionally, as shown in FIG. 6B, the first protrusion 125 is accommodated in the first recess 135, and the second protrusion 126 is accommodated in the second recess 136.

The bottom surface 135c of the first recess 135 is arcuate. A radius of curvature φRc1 of the bottom surface 135c is approximately equal to or slightly larger than a radius R (length Lm/2) when a length Lm of a straight line D connecting an end portion of the first protrusion 125 and an end portion of the second protrusion 126 is the diameter and the midpoint of the straight line D is the center. Here, the length Lm of the straight line D is equal to the sum of the length of the holder 120 along the y direction, a length Ly1 of the first protrusion 125, and a length Ly2 of the second protrusion 126. Note that when the first protrusion 125 has a hemispherical shape, the length Ly1 is substantially equal to half of the length Lz1.

Similarly, the bottom surface 136c of the second recess 136 is arcuate. A radius of curvature φRc2 of the bottom surface 136c is approximately equal to or slightly larger than the radius R (length Lm/2) when the length Lm of the straight line D is the diameter and the midpoint of the straight line D is the center.

Here, each of the radius of curvature φRc1 and the radius of curvature φRc2 is substantially equal to or slightly larger than the radius R based on the straight line D connecting the end portion of the first protrusion 125 and the end portion of the second protrusion 126. Accordingly, the bottom surface 135c of the first recess 135 and the bottom surface 136c of the second recess 136 form parts of a same circle Cm. Hence, the holder 120, together with the first protrusion 125 and the second protrusion 126, can smoothly rotate with reference to the z-axis direction.

Figure 7A:
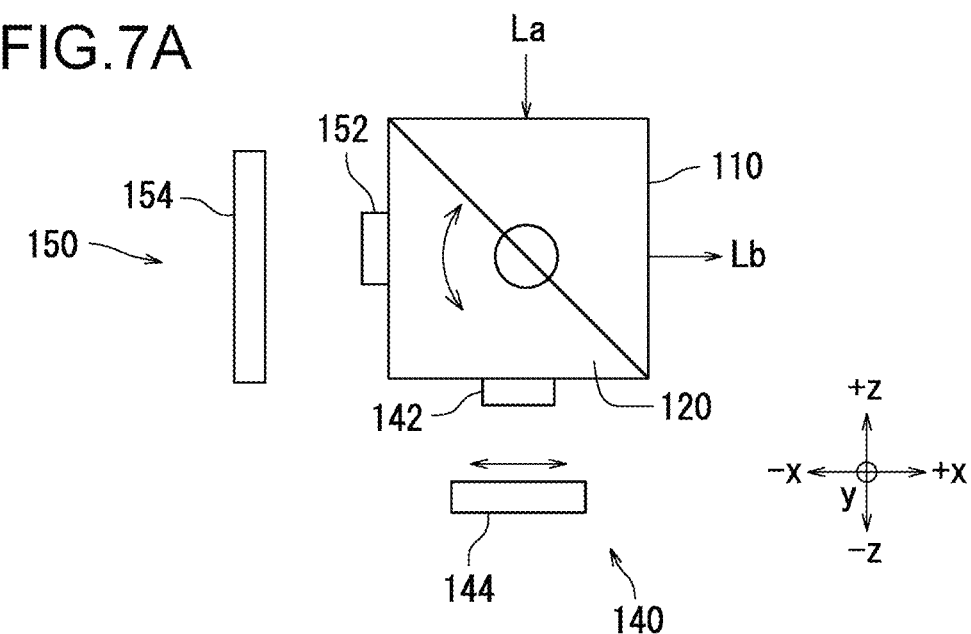
FIG. 7A is a schematic diagram for describing swinging by the first swing mechanism of the optical unit of the present embodiment.

Next, swinging of the optical unit 100 of the present embodiment will be described with reference to FIGS. 7A and 7B. FIG. 7A is a schematic diagram for describing swinging by the first swing mechanism 140 of the optical unit 100 of the present embodiment, and FIG. 7B is a schematic diagram for describing swinging by the second swing mechanism 150 of the optical unit 100 of the present embodiment.

As shown in FIG. 7A, the first swing mechanism 140 includes the first magnet 142 and the first coil 144. The first magnet 142 is provided in the holder 120, and the first coil 144 is provided in the case 130. Additionally, the second swing mechanism 150 includes the second magnet 152 and the second coil 154. The second magnet 152 is provided in the holder 120, and the second coil 154 is provided in the case 130.

By switching the direction of the current flowing through the first coil 144, the first magnet 142 receives a force along the x-axis direction. In this case, the first magnet 142 moves along the x-axis direction. Hence, the holder 120 to which the first magnet 142 is attached swings (pitches) with respect to the case 130 with reference to the y-axis direction.

Figure 7B:
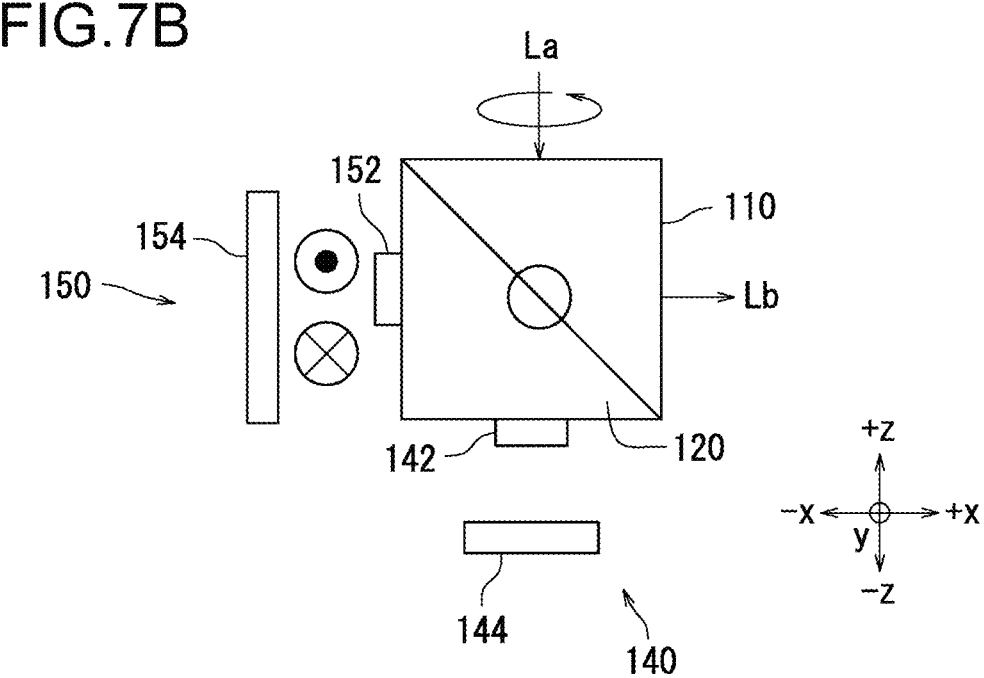
FIG. 7B is a schematic diagram for describing swinging by the second swing mechanism of the optical unit of the present embodiment.

As shown in FIG. 7B, by switching the direction of the current flowing through the second coil 154, the second magnet 152 receives a force along the y-axis direction. In this case, the second magnet 152 moves along the y-axis direction. Hence, the holder 120 to which the second magnet 152 is attached swings (yaws) with respect to the case 130 with reference to the z-axis direction.

Next, swinging by the first swing mechanism 140 of the optical unit 100 of the present embodiment will be described with reference to FIGS. 8A to 8C. FIGS. 8A to 8C are schematic diagrams for describing swinging by the first swing mechanism 140 of the optical unit 100 of the present embodiment. In FIG. 8A, the holder 120 of the optical unit 100 is located at the reference position, and in FIGS. 8B and 8C, the holder 120 swings in one or the other direction from the reference position.

As shown in FIG. 8A, when the holder 120 is in the reference position with respect to the case 130, the normal of the surface 110e of the optical element 110 points in the x-axis direction, and the reflected light Lb travels along the x-axis direction.

As shown in FIG. 8B, when a clockwise swing occurs with respect to the case 130 with reference to the +y-axis direction, the holder 120 can swing counterclockwise with respect to the case 130 with reference to the +y-axis direction. Additionally, as shown in FIG. 8C, when a counterclockwise swing occurs with respect to the case 130 with reference to the +y-axis direction, the holder 120 can swing clockwise with respect to the case 130 with reference to the +y-axis direction.

Figure 9A:
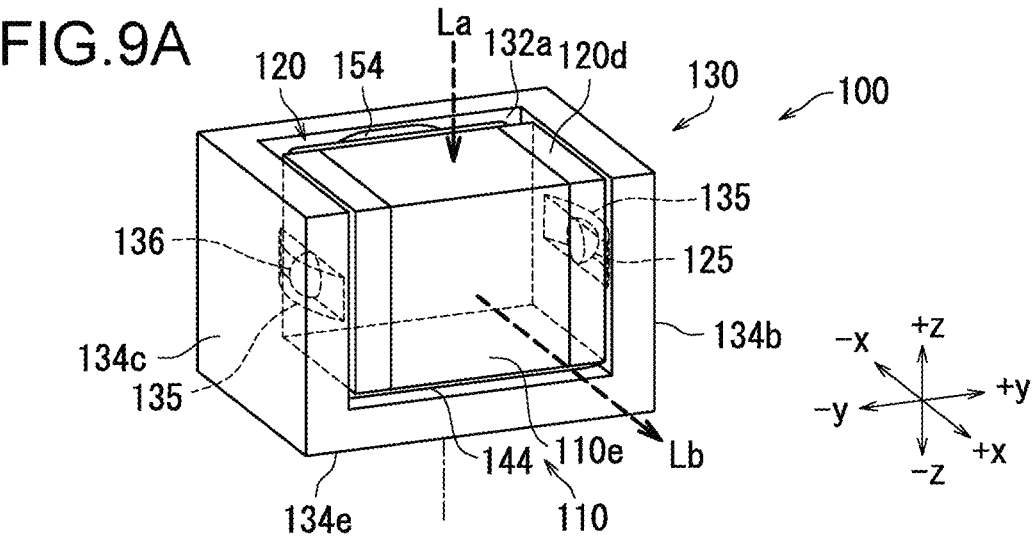
FIGS. 9A to 9C are schematic diagrams for describing swinging by the second swing mechanism of the optical unit of the present embodiment.
Figure 9B:
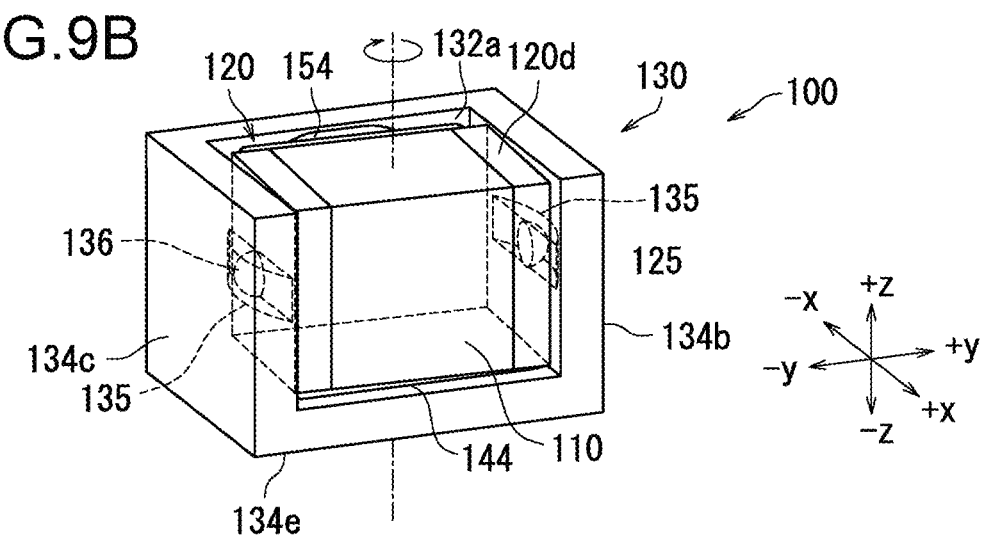
Figure 9C:
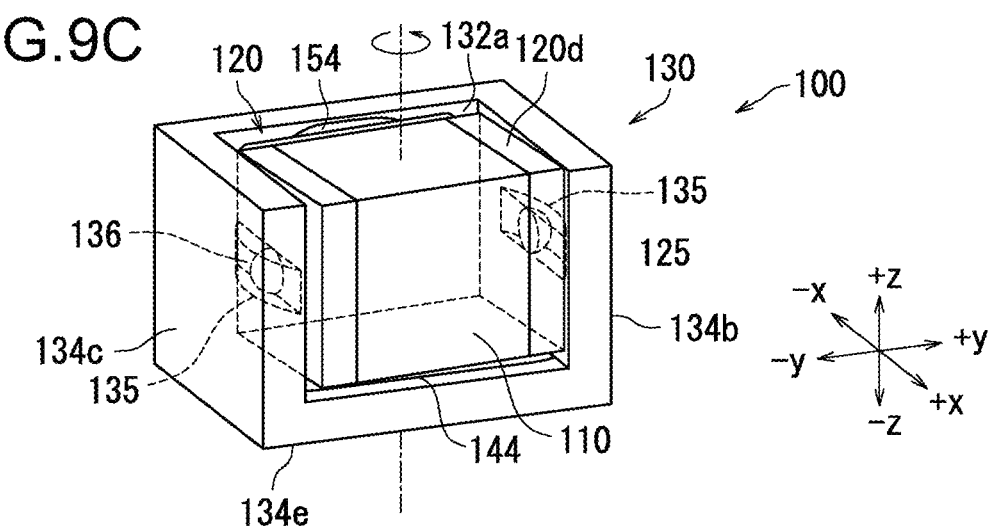

Next, swinging by the second swing mechanism 150 of the optical unit 100 of the present embodiment will be described with reference to FIGS. 9A to 9C. FIGS. 9A to 9C are schematic diagrams for describing swinging by the second swing mechanism 150 of the optical unit 100 of the present embodiment. In FIG. 9A, the holder 120 of the optical unit 100 is located at the reference position, and in FIGS. 9B and 9C, the holder 120 swings in one or the other direction from the reference position.

As shown in FIG. 9A, when the holder 120 is in the reference position with respect to the case 130, the normal of the surface 110e of the optical element 110 points in the x-axis direction, and the reflected light Lb travels along the x-axis direction.

As shown in FIG. 9B, when a counterclockwise swing occurs with respect to the case 130 with reference to the −z axis direction, the holder 120 can swing clockwise with respect to the case 130 with reference to the −z axis direction. Additionally, as shown in FIG. 9C, when a clockwise swing occurs with respect to the case 130 with reference to the −z axis direction, the holder 120 can swing counterclockwise with respect to the case 130 with reference to the −z axis direction.

Note that when the case 130 is made of resin, the resin is typically formed by integral molding. In this case, the case 130 may be formed of one component. Note, however, that the case 130 may be formed of multiple parts. For example, when the case 130 is formed of multiple parts, the parts of the case 130 may be assembled after the holder 120 is mounted.

Note that while the first protrusion 125 and the second protrusion 126 each have a hemispherical shape in the optical unit 100 shown in FIGS. 2A to 9, the present embodiment is not limited to this. The first protrusion 125 and the second protrusion 126 may have a columnar base portion, and the tip of the base portion may be hemispherical.

Additionally, in the optical unit 100 described with reference to FIGS. 2A to 9, since the holder 120 is swingably supported with respect to the case 130, the reference position of the holder 120 with respect to the case 130 is not fixedly defined in some cases. However, it is preferable that the reference position of the holder 120 with respect to the case 130 is fixed.

Figure 10:
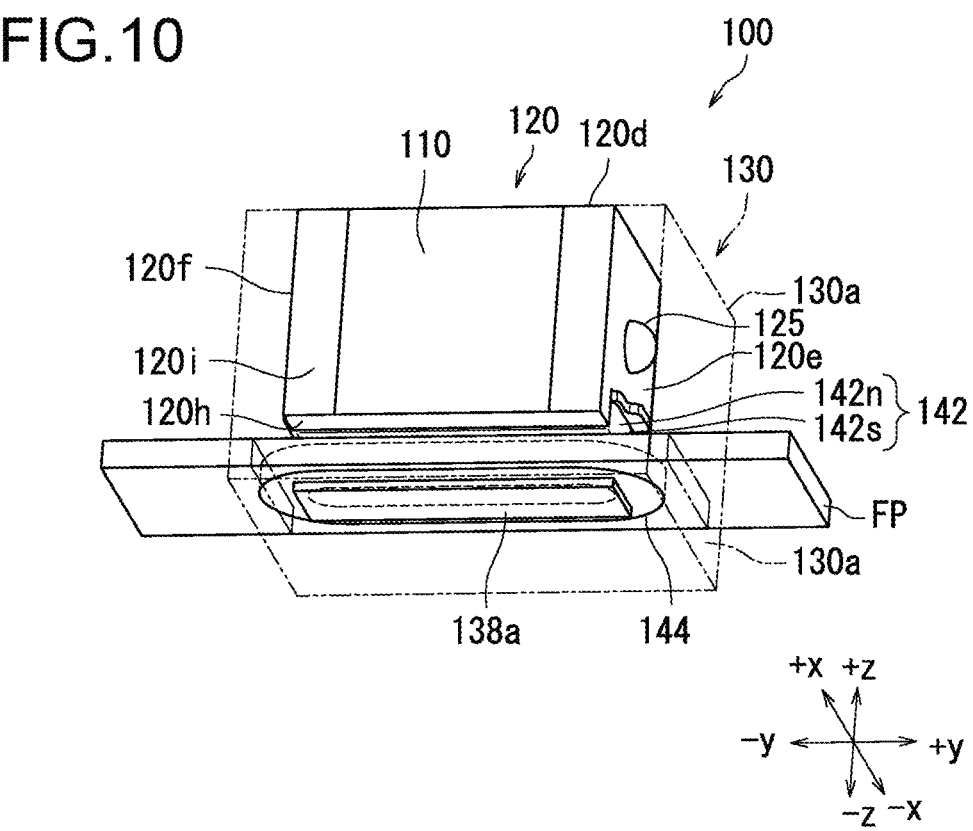
FIG. 10 is a schematic perspective view of the optical unit of the present embodiment.

Next, the optical unit 100 of the present embodiment will be described with reference to FIG. 10. FIG. 10 is a schematic perspective view of the optical unit 100 of the present embodiment. The optical unit 100 of FIG. 10 has a similar configuration as the optical unit 100 shown in FIGS. 2A and 2B, except that the case 130 has a case main body 130a and a metal member 138a, and a flexible printed circuit (FPC) FP is inserted in the case 130. Overlapping descriptions are omitted to avoid redundancy. Note that here, in order to avoid overly complicated drawings, the outer edge of the case 130 is shown by a chain double-dashed line.

As shown in FIG. 10, in the optical unit 100, the case 130 has the case main body 130a and the metal member 138a. The metal member 138a faces the first magnet 142.

Here, the metal member 138a is arranged inside the case main body 130a. Additionally, the metal member 138a is arranged in the vicinity of the first coil 144 located inside the case main body 130a. The metal member 138a allows the first magnet 142 and the holder 120 including the first magnet 142 to be positioned at a predetermined position when no current flows through the first coil 144. By arranging the metal member 138a with respect to the first swing mechanism 140, it is possible to define the position of the holder 120 with respect to the case 130 when no current is passed through the first coil 144. Note that the magnetic force generated between the metal member 138a and the first magnet 142 is weaker than the magnetic force generated when a current flows through the first coil 144. Hence, even if the metal member 138a is provided, the holder 120 is swung with respect to the case 130 by passing an electric current through the first coil 144.

Note that while the metal member 138a is arranged in the vicinity of the first coil 144 of the first swing mechanism 140 in FIG. 10, the present embodiment is not limited to this. The metal member 138a may be arranged so as to face the second magnet 152 and in the vicinity of the second coil 154 of the second swing mechanism 150.

The metal member 138a is preferably arranged symmetrically with respect to the center of the first coil 144. In FIG. 10, the metal member 138a extends in the y direction, similar to the N pole 142n and the S pole 142s of the first magnet 142, and the center of the metal member 138a in the x direction is located between the N pole 142n and the S pole 142s. In this case, since the first magnet 142 is attracted to the metal member 138a arranged symmetrically with respect to the center of the first coil 144, the position of the holder 120 with respect to the case 130 can be controlled appropriately. Similarly, the metal member 138a is preferably arranged symmetrically with respect to the center of the second coil 154. As a result, since the second magnet 152 is attracted to the metal member 138a arranged symmetrically with respect to the center of the second coil 154, the position of the holder 120 with respect to the case 130 can be controlled appropriately.

Moreover, in FIG. 10, the flexible printed circuit board FP is inserted into the case 130. The first coil 144 and the metal member 138a are mounted on the flexible printed circuit board FP. By inserting the flexible printed circuit board FP into the case 130, the first coil 144 and the metal member 138a can be arranged at predetermined positions with respect to the first magnet 142 of the holder 120. Note that the first coil 144 is preferably arranged inside the flexible printed circuit board FP. On the other hand, the metal member 138a may be arranged inside the flexible printed circuit board FP, or may be arranged on an outer surface of the flexible printed circuit board FP (e.g., outer surface on −z axis direction side).

Note that when the optical unit 100 is used for a smartphone as shown in FIG. 1, a gyro sensor in the smartphone detects the posture of the smartphone, and the first swing mechanism 140 and the second swing mechanism 150 are controlled according to the posture of the smartphone. On the other hand, it is preferable that the posture of the holder 120 with respect to the case 130 be detectable. As a result, the posture of the holder 120 with respect to the case 130 can be controlled with high accuracy.

Figure 11:
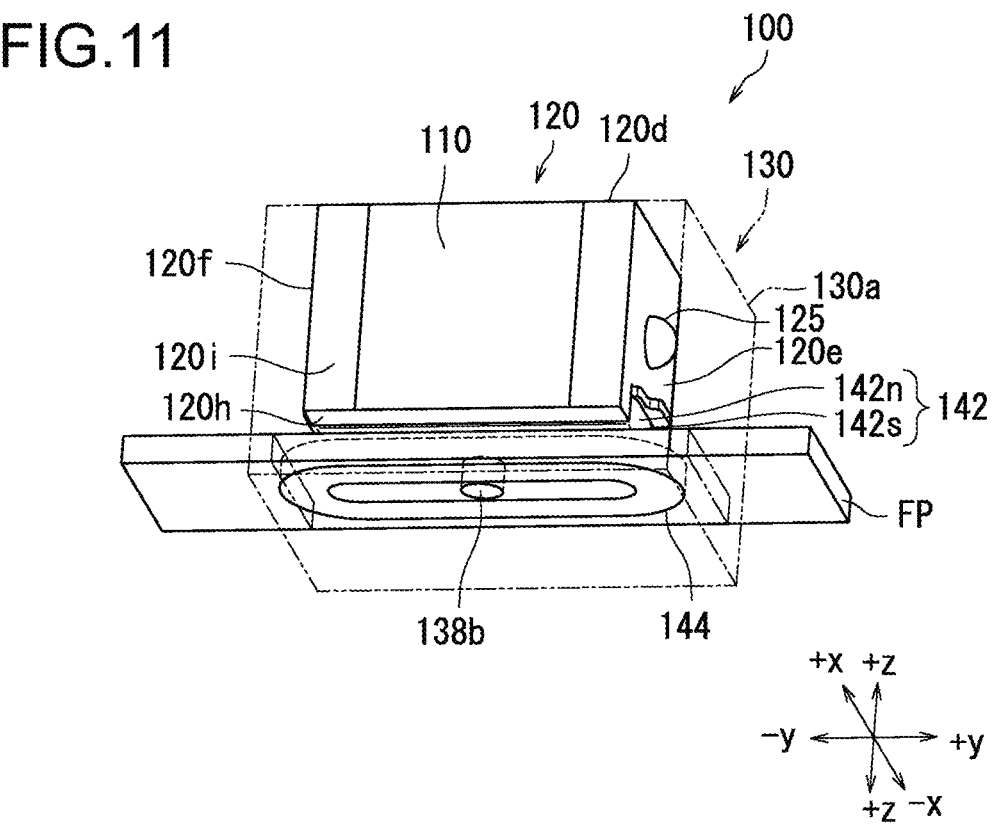
FIG. 11 is a schematic perspective view of the optical unit of the present embodiment.

Next, the optical unit 100 of the present embodiment will be described with reference to FIG. 11. FIG. 11 is a schematic perspective view of the optical unit 100 of the present embodiment. The optical unit 100 of FIG. 11 has a similar configuration as the optical unit 100 shown in FIG. 10, except that the case 130 has a Hall element 138b instead of the metal member 138a. Overlapping descriptions are omitted to avoid redundancy. Again, in order to avoid overly complicated drawings, the outer edge of the case 130 is shown by a chain double-dashed line.

As shown in FIG. 11, in the optical unit 100, the case 130 has the case main body 130a and a Hall element 138b. Here, the Hall element 138b is arranged inside the case main body 130a. Additionally, the Hall element 138b is arranged in the vicinity of the center of the first coil 144 located inside the case main body 130a. With the Hall element 138b, the position of the holder 120 with respect to the case 130 can be obtained.

Note that while the Hall element 138b is arranged in the vicinity of the first coil 144 of the first swing mechanism 140 in FIG. 11, the present embodiment is not limited to this. The Hall element 138b may be arranged in the vicinity of the second coil 154 of the second swing mechanism 150.

Note that the Hall element 138b is preferably arranged at the center of the first coil 144. As a result, the Hall element 138b can appropriately detect the magnetic force from the first magnet 142. Similarly, the Hall element 138b is preferably arranged at the center of the second coil 154. As a result, the Hall element 138b can appropriately detect the magnetic force from the second magnet 152.

Note that while the optical unit 100 shown in FIG. 10 has the metal member 138a and the optical unit 100 shown in FIG. 11 has the Hall element 138b, it goes without saying that the optical unit 100 may have both the metal member 138a and the Hall element 138b.

Note that while the first swing mechanism 140 has the first magnet 142 and the first coil 144 and the second swing mechanism 150 has the second magnet 152 and the second coil 154 in the description with reference to FIGS. 2A to 11, the present embodiment is not limited to this. The first swing mechanism 140 and the second swing mechanism 150 may have different configurations. For example, the first swing mechanism 140 and the second swing mechanism 150 may be mechanisms having a shape memory alloy.

Note that while the reflecting surface 110r of the optical element 110 is formed on the surface of the prism in the above description with reference to FIG. 1, the present embodiment is not limited to this. The optical element 110 does not have to include a prism, and the reflecting surface 110r does not have to be formed on a surface of the prism. For example, as the optical element 110, a thin plate-shaped reflective member (e.g., mirror) may be attached to the attachment portion 121 of the holder 120.

Note, however, that the optical element 110 preferably includes a prism. By including the prism in the optical element 110, the optical path can be shortened. Such an optical unit 100 is suitably used as an image sensor for a telephoto lens.

Note that while the optical unit includes the optical element 110 that changes the path of light by reflection in the above description with reference to FIGS. 2A to 11, the present embodiment is not limited to this. The optical unit may include an optical element that does not change the path of light.

Figure 12A:
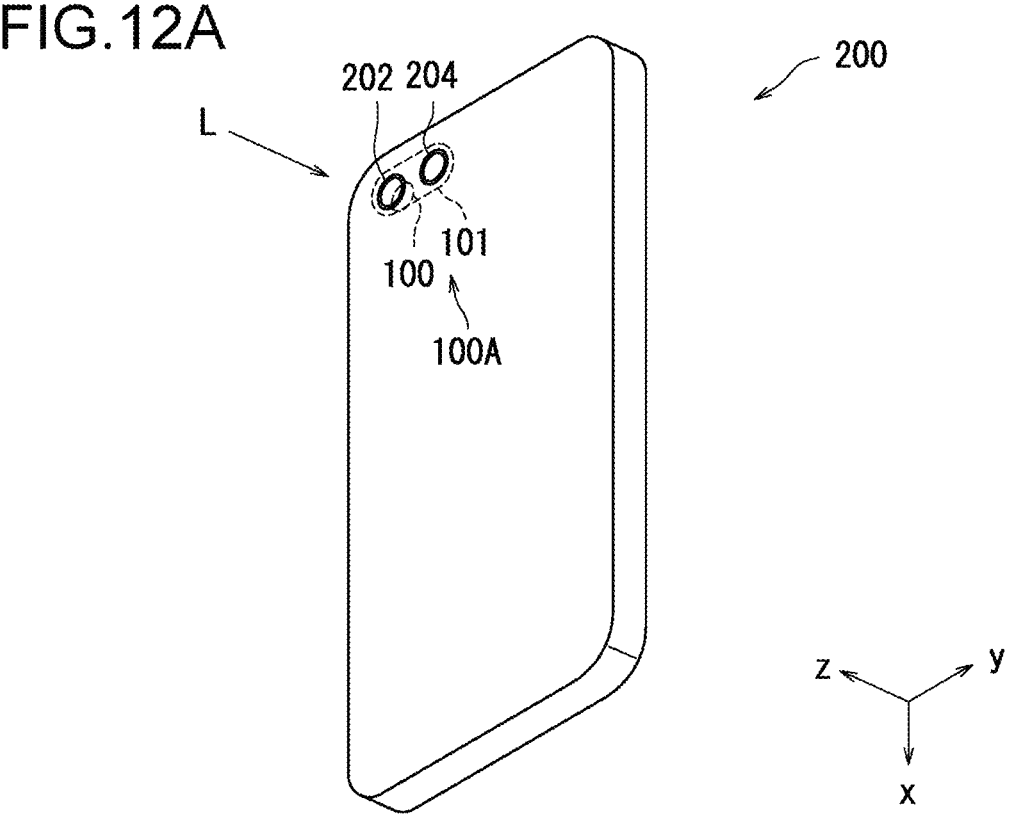
FIG. 12A is a schematic perspective view of a smartphone including the optical unit of the present embodiment.

Next, an optical module 100A including the optical unit 100 of the present embodiment will be described with reference to FIGS. 12A and 12B. FIG. 12A is a schematic perspective view of a smartphone 200 including the optical module 100A including the optical unit 100 of the present embodiment and another optical unit 101.

As shown in FIG. 12A, the smartphone 200 can perform two types of imaging. The smartphone 200 includes the lens 202 and a lens 204 on which light is incident. In the smartphone 200, the optical module 100A is arranged on the inner side of the lens 202 and the lens 204. Specifically, the lens 202 is arranged corresponding to the optical unit 100, and the lens 204 is arranged corresponding to the optical unit 101.

Light L is incident on the smartphone 200 from the outside through the lens 202 in the incident direction, and a subject image is captured on the basis of light that has passed through the optical unit 100. Similarly, light L is incident from the outside through the lens 204 in the incident direction, and a subject image is captured on the basis of light that has passed through the optical unit 101.

Figure 12B:
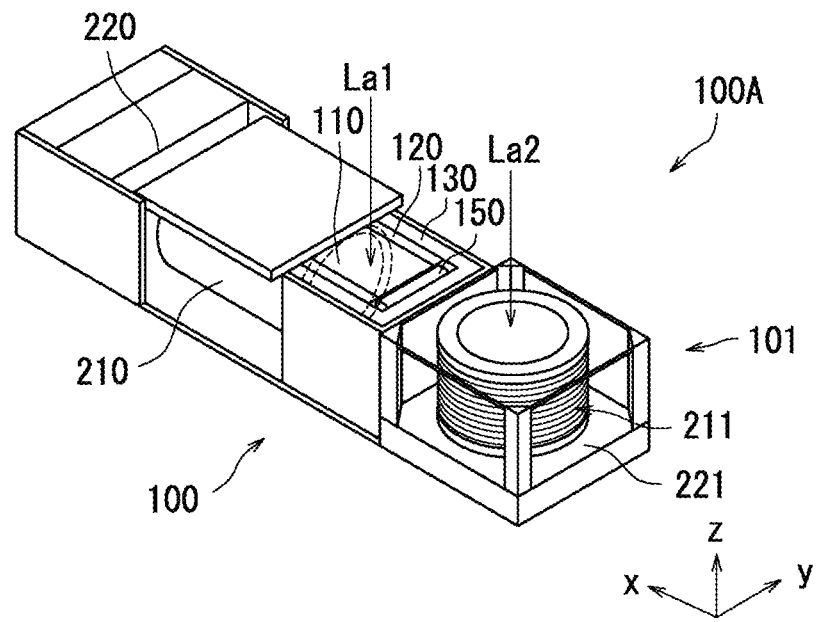
FIG. 12B is a schematic perspective view of an optical module including the optical unit of the present embodiment.

FIG. 12B is a schematic perspective view of the optical module 100A of the present embodiment. The optical module 100A of FIGS. 12A and 12B includes the optical unit 100 having a similar configuration as that described above with reference to FIGS. 1 to 11, and another optical unit 101.

As shown in FIG. 12B, the optical unit 100 reflects the optical axis of incident light La1 incident along the z-axis direction as the reflected light Lb in the x-axis direction. Thereafter, the reflected light Lb is received by the image sensor 220 through the lens module 210 of the smartphone 200. The lens module 210 includes various lenses depending on the application.

The optical unit 101 receives incident light La2 incident along the z-axis direction. The optical unit 101 receives light by an image sensor 221 through a lens module 211 without changing the direction of the optical axis from the z-axis direction. The lens module 211 includes various lenses depending on the application.

Note that while FIGS. 1 and 12 show a smartphone as an example of the application of the optical unit 100 of the present embodiment, the application of the optical unit 100 is not limited to this. The optical unit 100 is preferably used as a digital camera or a video camera. For example, the optical unit 100 may be used as part of a drive recorder. Alternatively, the optical unit 100 may be mounted on a motion picture camera for flying objects (e.g., drones).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit, comprising:
an optical element that has a reflecting surface reflecting light in a first axis direction;
a holder configured to hold the optical element;
a case configured to swingably support the holder;
a first swing mechanism configured to cause the holder to swing with respect to the case with reference to a second axis direction orthogonal to the first axis direction; and
a second swing mechanism configured to cause the holder to swing with respect to the case with reference to a third axis direction orthogonal to each of the first axis direction and the second axis direction, wherein:
the holder has
a first protrusion provided on a first case facing surface facing the case and projecting toward the case, and
a second protrusion provided on a second case facing surface facing the case and projecting toward the case;

the case has
- a first recess provided on a first holder facing surface facing the first case facing surface of the holder and accommodating at least a part of the first protrusion, and
- a second recess provided on a second holder facing surface facing the second case facing surface of the holder and accommodating at least a part of the second protrusion;

the first recess has
- a first side surface located on one side in the third axis direction of the first protrusion,
- a second side surface located on the other side in the third axis direction of the first protrusion, and
- a bottom surface connecting the first side surface of the first recess and the second side surface of the first recess;

the second recess has
- a first side surface located on one side in the third axis direction of the second protrusion,
- a second side surface located on the other side in the third axis direction of the second protrusion, and
- a bottom surface connecting the first side surface of the second recess and the second side surface of the second recess;

the first protrusion is configured to move in the first recess, in which the first protrusion is accommodated, while the holder is caused to swing by the first swing mechanism:

the first protrusion is configured to move in the first recess, in which the first protrusion is accommodated, while the holder is caused to swing by the second swing mechanism:

the second protrusion is configured to move in the second recess, in which the second protrusion is accommodated, while the holder is caused to swing by the first swing mechanism; and the second protrusion is configured to move in the second recess, in which the second protrusion is accommodated, while the holder is caused to swing by the second swing mechanism.

2. The optical unit according to claim 1, wherein:
the first protrusion has a partially spherical shape;
the bottom surface of the first recess has a partially spherical shape;
the second protrusion has a partially spherical shape; and
the bottom surface of the second recess has a partially spherical shape.

3. The optical unit according to claim 1, wherein the bottom surface of the first recess and the bottom surface of the second recess form parts of the same circle.

4. The optical unit according to claim 1, wherein the optical element includes a prism.

5. The optical unit according to claim 1, wherein the first swing mechanism includes
- a first magnet provided on one of the holder and the case, and
- a first coil provided on the other of the holder and the case so as to correspond to the first magnet, and the second swing mechanism includes
- a second magnet provided on one of the holder and the case, and
- a second coil provided on the other of the holder and the case so as to correspond to the second magnet.

6. The optical unit according to claim 5, wherein
the holder includes the first magnet and the second magnet, and
the case includes the first coil and the second coil.

7. The optical unit according to claim 5, wherein:
the holder further includes
- a first swing mechanism attachment surface connected to the first case facing surface and the second case facing surface and having a normal extending parallel to the third axis direction, and
- a second swing mechanism attachment surface connected to the first case facing surface and the second case facing surface and having a normal extending parallel to the first axis direction;

one of the first magnet and the first coil of the first swing mechanism is attached to the first swing mechanism attachment surface; and one of the second magnet and the second coil of the second swing mechanism is attached to the second swing mechanism attachment surface.

8. The optical unit according to claim 7, wherein
the holder further includes an optical element attachment surface located between the first case facing surface and the second case facing surface, and is arranged obliquely with respect to the first swing mechanism attachment surface and the second swing mechanism attachment surface, and
the optical element is located on the optical element attachment surface of the holder.

9. The optical unit according to claim 5, wherein
the case further includes a case main body and a Hall element.

10. The optical unit according to claim 9, wherein
the Hall element is arranged at the center of at least one of the first coil and the second coil.

11. The optical unit according to claim 5, wherein
the case includes a case main body and a metal member, and
the metal member faces at least one of the first magnet and the second magnet.

12. The optical unit according to claim 11, wherein
the metal member is arranged symmetrically with respect to the center of at least one of the first coil and the second coil.

13. The optical unit according to claim 1, wherein
the holder is configured to swing with respect to the case about the first protrusion and the second protrusion by the first swing mechanism.

* * * * *